2 Sheets--Sheet 1.

A. M. SWAIN.

Water-Wheel.

No. 5,154.

Reissued Nov. 19, 1872.

Witness
Nathaniel Hill.
Wm. B. Henderson

Swain Turbine Company
Assignees of A. M. Swain
N. W. Hoardman Agt.
and Attorney

2 Sheets--Sheet 2.

A. M. SWAIN.

Water-Wheel.

No. 5,154.

Reissued Nov. 19, 1872.

Witness
Nathaniel Hill
Wm. G. Simmons

Swain Turbine Company
Assignees of A. M. Swain
H. W. Boardman Agt.
and Attorney

BEST AVAILABLE COPY

UNITED STATES PATENT OFFICE.

ASA M. SWAIN, OF LOWELL, MASSACHUSETTS, ASSIGNOR, BY MESNE ASSIGNMENTS, TO THE SWAIN TURBINE COMPANY, OF SAME PLACE.

IMPROVEMENT IN WATER-WHEELS.

Specification forming part of Letters Patent No. 28,314, dated May 15, 1860; reissue No. 5,154, dated November 19, 1872.

*To all whom it may concern:*

Be it known that ASA M. SWAIN, of Lowell, Massachusetts, has invented certain Improvements in Water-Wheels, of which the following is a specification:

This invention relates particularly to the improved construction, combination, and arrangement of the different parts of a water-wheel in such a manner as to effectively combine in one wheel the elements of an inward-flow turbine and a downward-flow turbine, together with an effective direction of the water at any opening of the gate, giving increased capacity, compactness, efficiency, and economy to the wheel.

Figure 2:
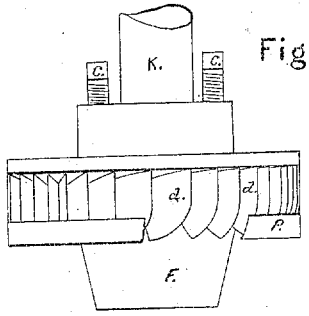
Figure 1:
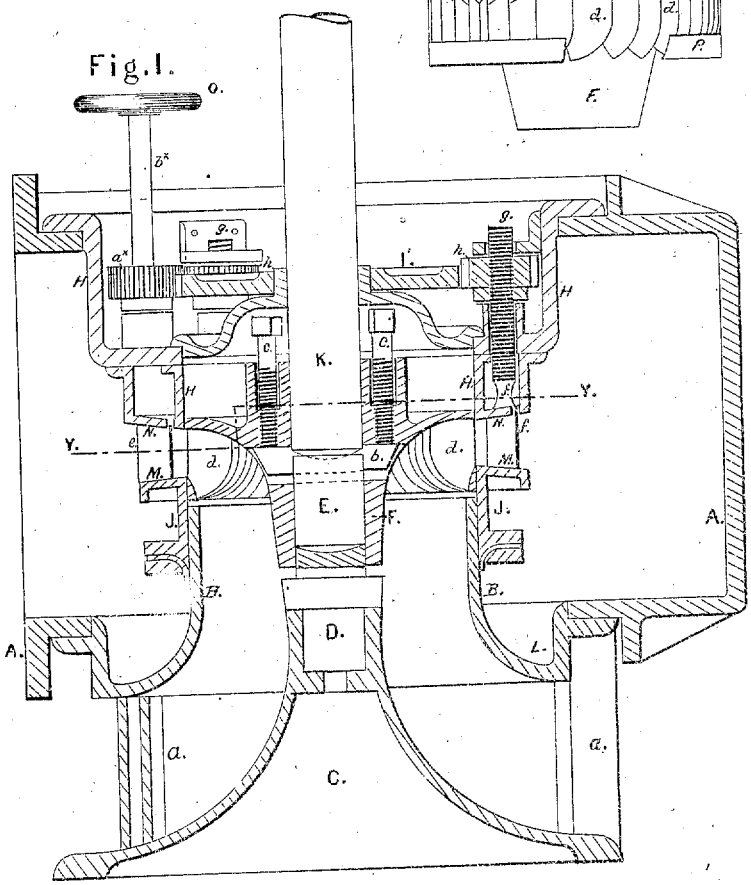
Figure 3:
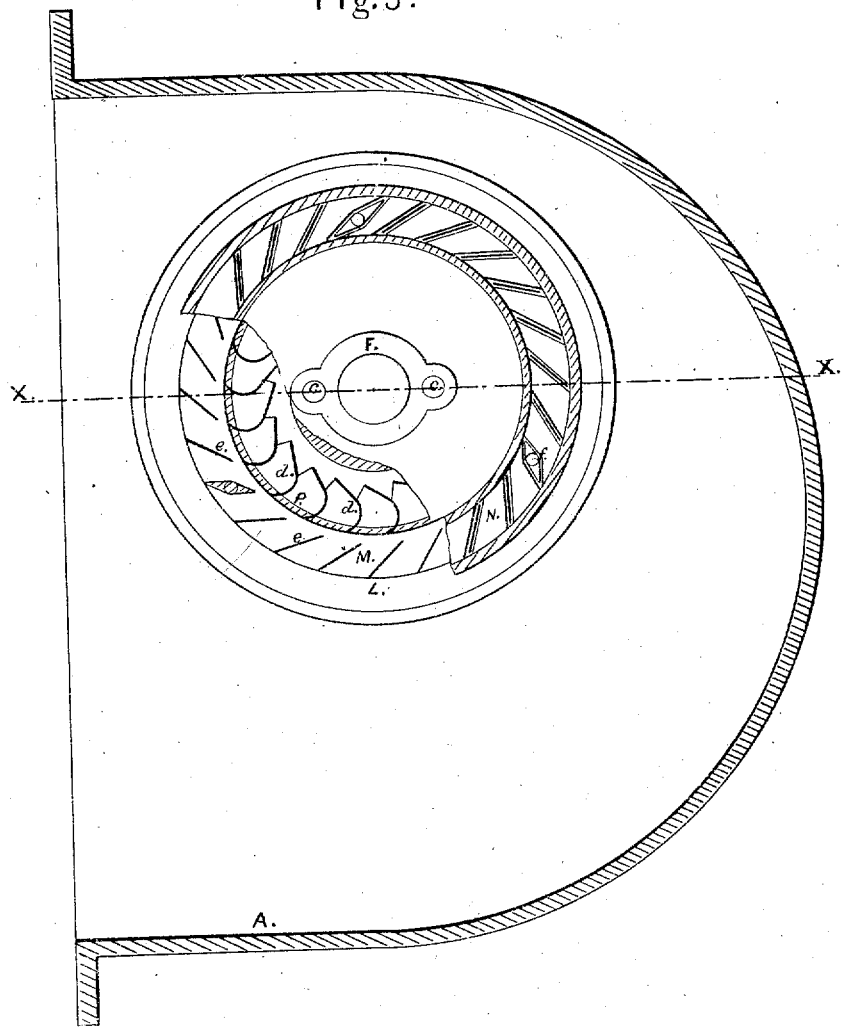

Figure 1 is a vertical section on a line, *x x*, Fig. 3, Sheet 2, of a wheel embodying this invention. Fig. 2, Sheet 1, is a side view of the wheel with a portion of the band broken away and showing the floats; and Fig. 3, Sheet 2, is a horizontal section on a line, *y y*, Fig. 1, Sheet 1, of a wheel embodying this invention.

A is an outer case surrounding the wheel, through which the water passes to the wheel. B is a lower curb, on the outer flange of which rests the case A. This curb has a sediment-chamber, L. The upper portion forms a bearing and guide for the cylindrical gate J and its packing *i i*. This curb is supported by the standards *a a*, Fig. 1, Sheet 1, which rest on the outer edge of the bell-shaped base C. In the top of the base C is placed an iron block, D, which forms a step to receive the wooden block E, which is fitted in the lower end of the hub F of the wheel G. Transversely through the hub F and block E a bar, *b*, passes, said bar having screws *c c* bearing on it—one near each end. These screws *c c* pass up through the hub of the wheel, and by adjusting them the wheel may be raised or lowered, as desired. The shaft K is attached to the hub F of the wheel G. To the crown of the wheel G are attached the floats *d*. P is a band which may be attached to the lower outer edges of the floats to give greater rigidity. The upper horizontal edge of the floats is attached to the crown of the wheel, and the outer lower edge may be attached to a band. The surface of the floats may be curved in a horizontal direction at their upper portion, and have a curve of double curvature at their lower portion.

By this construction and arrangement of the crown and floats we combine an inward-flow turbine and a downward-flow turbine effectively in one wheel, which gives greater area of discharge nearer the center of the wheel, the floats having a discharge-line equal to the height of the float in the well-known Fourneyron or Warren wheels, and that due to the width of the float in a radial direction, as in the Jouval turbine.

J is a cylindrical gate fitted around the upper portion of the curb B, and packed against the curb at *i i* with leather or other suitable packing. M is a disk attached to the gate J, over which the water flows to the wheel G. N is also a disk attached to the lower edge of the upper curb H, under which the water passes to the wheel. These disks facilitate and direct the passage of the water to the wheel. Guides *e e* are attached to the gate-disk M, and pass through slots in the upper disk N. This arrangement permits the gate to be opened and closed, while the guides at all times extend from one disk to the other. The gate J is closed by raising it to meet the lower edge of the curb H, these edges being fitted to form a water-tight joint. By this arrangement the water is, at part gate as well as at full gate, conducted onto the upper portion of the floats of the wheel, when it acts with the greatest efficiency, obviating almost wholly the objections incident to other turbines at part gate.

The gate is operated by means of the screws *f f* attached to the gate-disk M and working in gear-nuts *h h*, moved by the gear I′, engaging all the gear-nuts, and operated by the pinion *a*× and hand-wheel *o*. Attached to the case A is the curb H, which, with the gate J and its packing *i i*, prevents the water from flowing away except through the wheel.

We claim as the invention of the said ASA M. SWAIN, the following, to wit;

1. A water-wheel, the floats of which have a discharge-line extending from the crown at their inner edge to the lower outer edge of the wheel.

2. The combination, in a water-wheel, of a

BEST AVAILABLE COPY crown, band, and floats, having their discharge-line extending from the crown at their inner edge to their lower outer edge.

3. The combination, in a water-wheel, of a crown and floats having their discharge-line extending from the crown at their inner edge to the lower outer edge.

4. The combination of the screws *c c*, bar *b*, and block E, for the purpose specified.

5. A water-wheel having an effective inward flow and discharge of part of the water and an effective downward flow and discharge of part of the water simultaneously in one wheel, whereby the effective area of discharge is increased without increasing the diameter of the wheel.

6. The gate J attached to disk M, as shown and described.

7. The gate J with its disk M, combined with the disk *h*, for the purposes shown and stated.

8. The gate J with its disk M and disk N, in combination with the guides *e*, as shown and described.

9. The combination and arrangement of a gate, J, with reference to the wheel G and curb H, for the purposes specified.

10. A water-wheel having the gate opening downward, for the purposes specified.

11. The chamber L for receiving sediment, as shown and described.

SWAIN TURBINE COMPANY.
By H. W. BOARDMAN,
*Agent and Attorney.*

Witnesses:
JOHN B. MOTLEY,
NATHANIEL HILL.